United States Patent
Oda et al.

(10) Patent No.: US 7,435,360 B2
(45) Date of Patent: Oct. 14, 2008

(54) MANUFACTURING PROCESS OF CONDUCTIVE COMPOSITION AND A MANUFACTURING PROCESS OF CONDUCTIVE PASTE

(75) Inventors: Kazuhiko Oda, Tokyo (JP); Tetsuji Maruno, Tokyo (JP); Akira Sasaki, Tokyo (JP); Kouji Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 494 days.

(21) Appl. No.: 10/803,880

(22) Filed: Mar. 19, 2004

(65) Prior Publication Data

US 2004/0188658 A1 Sep. 30, 2004

(30) Foreign Application Priority Data

Mar. 24, 2003 (JP) .............................. 2003-080932

(51) Int. Cl.
- *H01B 1/02* (2006.01)
- *H01G 4/08* (2006.01)
- *B01F 3/12* (2006.01)
- *B32B 5/16* (2006.01)

(52) U.S. Cl. ...................... 252/513; 252/506; 252/512; 252/514; 252/518.1; 252/519.1; 366/162.4; 428/402; 428/403; 75/232; 75/255; 148/513; 427/216; 361/306.3; 361/321.4

(58) Field of Classification Search ................ 252/500, 252/512, 514; 427/216, 212, 240; 51/307; 75/232, 252, 255, 741; 148/513; 106/31.59, 106/286.1; 241/5, 24.13; 366/162.4
See application file for complete search history.

(56) References Cited

U.S. PATENT DOCUMENTS

| | | | | |
|---|---|---|---|---|
| 4,551,357 A | * | 11/1985 | Takeuchi | 427/97.5 |
| 5,071,618 A | * | 12/1991 | Sanchez-Caldera et al. | 419/12 |
| 5,296,189 A | * | 3/1994 | Kang et al. | 419/9 |
| 5,852,076 A | * | 12/1998 | Serafin et al. | 523/315 |
| 6,207,081 B1 | * | 3/2001 | Sasaki et al. | 252/512 |
| 6,368,378 B2 | * | 4/2002 | Sasaki | 75/252 |
| 6,406,513 B2 | * | 6/2002 | Yamaguchi et al. | 75/255 |

FOREIGN PATENT DOCUMENTS

| | | |
|---|---|---|
| JP | A 8-78267 | 3/1996 |
| JP | A 9-201521 | 8/1997 |
| JP | A 9-299774 | 11/1997 |
| JP | A 2001-357720 | 12/2001 |
| JP | A 2002-245874 | 8/2002 |
| WO | WO00/04559 | 1/2000 |

* cited by examiner

*Primary Examiner*—Stanley Silverman
*Assistant Examiner*—Kallambella Vijayakumar
(74) *Attorney, Agent, or Firm*—Oliff & Berridge, PLC

(57) ABSTRACT

A manufacturing method of conductive paste comprising arranging process (S20 to S23) of ceramics particles, arranging process (S10 to S14) of wetted metal particles, forming process (S30) of slurry wherein metal particles and ceramics particles are mixed and dispersion treatment process (S32) by applying collision to the slurry. The arranging process of wetted metal particles comprises, a process (S12) of adding solvent, compatible with organic component in conductive paste and incompatible with water, to undried water washed metal particles, a process (S18) of adding surfactant, a process (S14) of separating water from the metal particles and a process (S15) of adding acetone or the other second solvent.

9 Claims, 4 Drawing Sheets

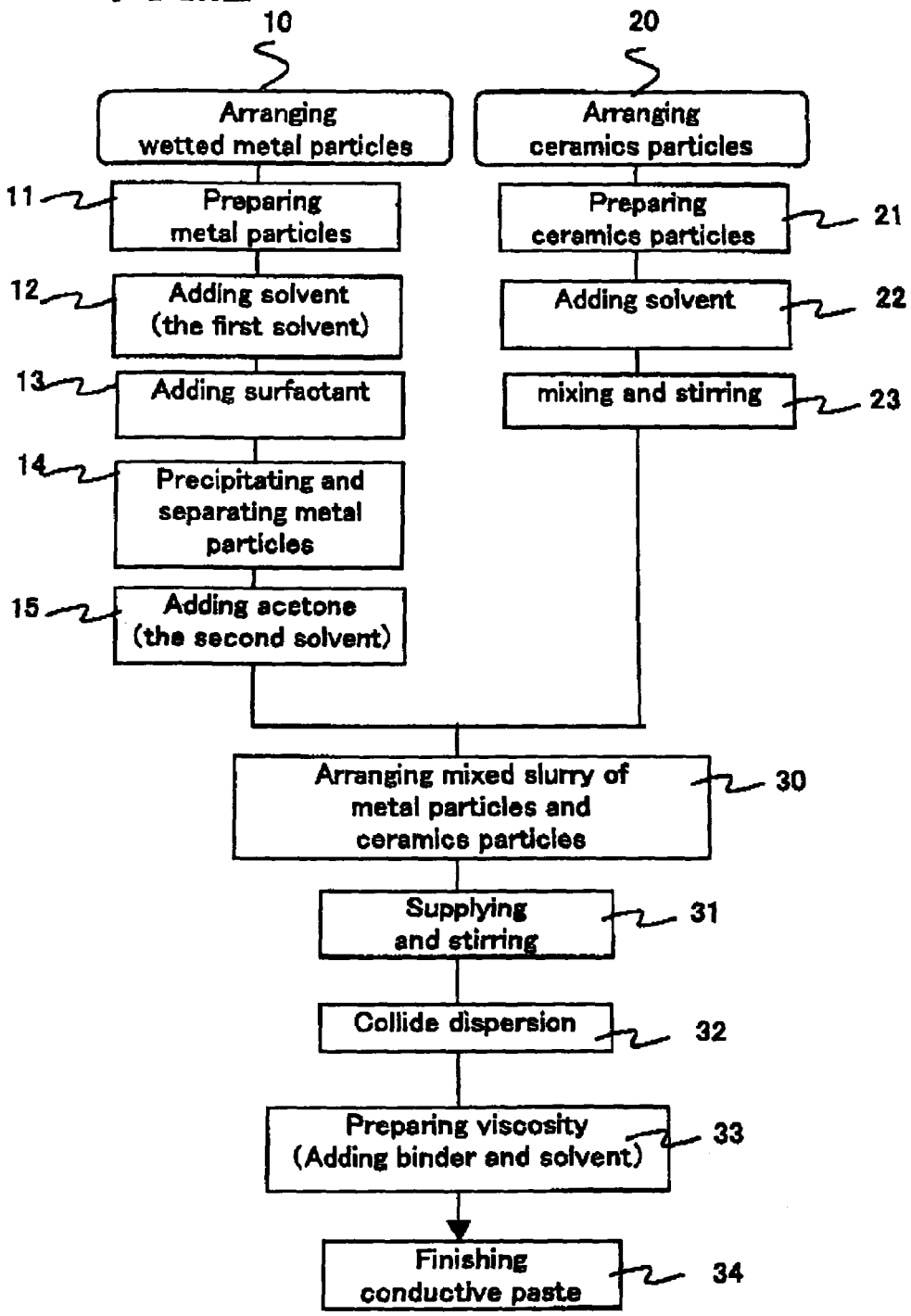

MANUFACTURING PROCESS OF CONDUCTIVE COMPOSITION AND A MANUFACTURING PROCESS OF CONDUCTIVE PASTE

BACKGROUND OF THE INVENTION

1. Field of the Invention

The present invention relates to a conductive composition and a manufacturing process of conductive paste used as electronic device of multilayer structure.

2. Description of the Related Art

As the miniaturization of electric devices, it is required to provide more compact electronic components, such as inductors, capacitors, and filters, for use in such electronic devices. To maintain electronic characteristics and to achieve further miniaturization of electronic component, conductive filter is required to have a smooth surface and absolutely no pinhole. And metal particles in conductive composition are required for further reduction in size and higher dispersion. Aggregated metal particles and deformed metal particles at conductive paste forming internal electrodes of ceramics multilayer component may cause electric defective such as short. Particularly, at thin film multilayer electronic component, metal particles are required for further reduction in size and higher dispersion. When particle size of the aggregated metal particles becomes larger than film thickness of the internal electrodes, ceramics between the internal electrodes is greatly stressed, resulting in a marked reduction in the reliability and a lower yield of the ceramic laminated component.

Conventionally, as methods to disperse metal powders into a vehicle and an organic solvent, a method using media such as Laikai machine (a mixing and grinding machine), a triple roller or a ball mill, and a collision dispersion method which high pressure slurries collide among themselves are proposed. The collision dispersion method is disclosed in Japanese Patent Unexamined Publication 9-201521, Japanese Patent Unexamined Publication 9-299774, Japanese Patent Unexamined Publication 10-57789, PCT publication WO00/04559, Japanese Patent Unexamined Publication 10-887457 and Japanese Patent Unexamined Publication 11-1460511 or so.

However, media used disperse treating method, when particle of metal particles is submicron order or less, or when the metal particles are firmly aggregated, had a problem of not being able to make metal parties ultra-fine particles and disperse the particles uniformly. Further problem was excess action of medias deforming metal particles.

Moreover, collision dispersion method, after a drying step, had its limit for firmly aggregated metal particles to be sufficiently crushed and to be uniformly dispersed. And to disperse the firmly aggregated metal particles to a certain extent, lengthy treatment is required and a longer treating time and a great deal of energy should be spent. Accordingly, poor step efficiency and increased production costs bound to result.

Therefore, a process of preventing aggregation of the metal particles by wetting the metal particles is proposed (See Japanese Patent Unexamined Publication 2001-357720).

Moreover, when used as internal electrodes of multilayer form, to inhibit reaction at firing and to prevent occurrence of delamination, ceramics powder comprising conductive paste is proposed (See Japanese Patent Unexamined Publication 8-78267).

However, with conventional dispersing method, dispersion of metal particles as well as mixing and dispersion of metal parties slurry and ceramics particles slurry were not sufficient. Due to this, an electrode film formed by using conductive paste which is obtained by conventional method, had film thickness of insufficient uniformity preventing improvement for yield of the electronic component.

Further, due to the method of wetting the metal particles, aggregation of metal particles can be prevented, however, the metal particles were unlikely to be dispersed highly.

SUMMARY OF THE INVENTION

Object of the present invention is to provide a conductive composition and a conductive paste wherein metal particles are highly made to ultra-fine particles without deformation and also the metal particles are dispersed uniformly in the conductive composition.

To attain the above object, a manufacturing process of conductive composition and conductive paste of the invention including metal particles and ceramics particles comprises the steps of wetting undried said metal particles having been water washed and applying collision force to a slurry including at least said wetted metal particles and said ceramics particles.

The present invention comprises the steps of applying collision force to slurry including at least said wetted metal particles and said ceramics particles. By applying the collision force to this slurry, metal particles are highly made to ultra-fine particles and the metal particles can highly be dispersed.

Namely, by applying collision force to slurry, force is applied to the slurry from various directions and the slurry collides with internal wall of collision chamber developing turbulence in the slurry. Consequently, shear force acts on the slurry that metal particles and ceramics particles included in the slurry are crushed progressing to make the particles ultra-fine particles. And by the turbulence developed in the slurry, metal particle and ceramics particles in the slurry collide mutually causing both particles to be crushed, mixed and dispersed. Accordingly, metal particles are highly made to ultra-fine particles and the metal particles can highly be dispersed.

Method to apply collision force to slurry is not particularly limited but colliding a first slurry including at least said wetted metal particles and said ceramics particles with a second slurry supplied along contrary different direction from the first slurry is preferable.

For instance, after applying pressure to the first slurry, the first slurry supplied with a specific degree of pressured condition preferably collides with the second slurry supplied along contrary different direction from the first slurry. Needless to say, after applying pressure to the second slurry, the second slurry supplied with a specific degree of pressured condition may collide with first slurry supplied along contrary different direction from the second slurry. Also, after applying pressure to both first and second slurries, the first and the second slurries may be supplied along contrary different directions and the first and the second slurries may collide mutually. The directions of the collision are not limited, they may collide from opposed side or may collide by intersecting at an angle.

In this step, the first and the second slurries may have substantially the same composition or the first and the second slurries may have different composition. From the point of unifying the composition of whole slurry, the first and the second slurries preferably have substantial the same composition. From the point of utilization of high mixing and dispersion acts of the present invention even when the first and the second slurries have different composition, slurry with unified composition can be obtained. In this case, the step of making the first and the second slurries to have the same composition can be omitted.

Present invention comprises the step of wetting undried metal particles having been water washed. Namely, drying step after the water washing is not included. Metal particles are firmly aggregated by drying and after this drying, it is difficult to disperse again. To the contrary, since present invention does not include drying step, by wetting undried metal particles after water washing, metal particles that are made to ultra-fine particles can be covered with liquid and can maintain the particles not to aggregate after the washing.

The liquid wetting metal particles is preferably a solvent being compatible with an organic component included in said conductive composition and incompatible with water. Accordingly, metal particles and organic component have compatibility to each other while water can easily be removed from metal particles.

Further, after addition of solvent, it is preferable to add surface active solvent to metal particles. Due to this, lubricity between the metal particles can be enhanced leading the improvement of fluidity for slurry at mixing treatment process afterwards.

Further, after addition of surface active solvent, it is preferable to add a water compatible volatile solvent. A water compatible volatile solvent such as acetone has an affinity for water and volatilize with water. Due to this, adhesive water to the metal particles may efficiently be removed.

The collision dispersion slurry of the present invention includes ceramics particles. When applying collision force to slurry comprising wetted metal particles and ceramics particles, ceramics particles function as mixing and dispersion media. By applying collision force, ceramics particles in turbulence developed slurry contact with metal particles and aggregated metal particles with weak force are crushed. The same as above, ceramics particles themselves that contact with metal particles also are crushed and made to ultra-fine particles. Due to this, metal particles and ceramics particles can both be made to ultra-fine particles.

Further, in the invention, ceramics particles comprised in conductive composition are used as media so that mixing foreign matters or impurities through media can be prevented. That is, conventionally, alumina balls and zirconia balls or so are used as dispersion media that there existed a problem of mixing foreign matters or impurities (alumna and zirconia or so from dispersion media) during dispersion process which should not originally be included in conductive composition. To the contrary, in the present invention, since ceramics particles function as dispersion media, the conventional problem of mixing impurities does not occur. The added ceramics particles are preferably materials having identical composition with or having no effect to the characteristic of multilayer form wherein conductive materials are used as internal electrodes.

In the present invention, an average particle size of ceramics particles is preferably, less than an average particle size of metal particles. More preferably, an average particle size of ceramics particles is a half of or less than an average particle size of said metal particles. Most preferably, an average particle size of said ceramics particles is a quarter of or less than an average particle size of said metal particles. By setting ratio of particle size for ceramics particles and metal particles as mentioned above, the strength of action by ceramics particles functioning as media in collision dispersion process can be controlled, preventing deformation of metal particles and the metal particles can highly be made to ultra-fine particles.

Average particle size of metal particles is preferably 1.0 μm or less, more preferably 0.5 μm or less, most preferably 0.4 μm or less and particularly 0.2 μm or less is preferable. Normally, metal particles with an average particle size of 0.5 μm or less is likely to aggregate, however, by using process of the invention, the metal particles are prevented from aggregating. Then, the metal particles are highly made to ultra-fine particles and conductive composition wherein metal particles are highly dispersed can be provided.

Metal particles are preferably Ni or Ni content compound.

Further, in the present invention, wetted metal particles, ceramics particles and organic components are used and aggregated metal particles are not included in slurry. Accordingly, damage provided to collision mix dispersion equipment could be decreased. For instance, when slurry jets through nozzle (an opening for supply) with small opening radius, a process using slurry comprising dried metal particles than a process using slurry comprising wetted metal particles as in the invention is able to make lifetime of the nozzle longer.

According to the present invention, the time required for disperse treatment of slurry can be shortened and efficiency for dispersion can be improved leading to lower the costs throughout the step.

Manufacturing process for conductive composition of the invention can be used as manufacturing process or a conductive paste to form an electrode on ceramic dielectric substrate. Namely, conductive paste preferably includes conductive composition manufactured by the manufacturing process of the invention. Further, multilayer electronic component is preferably manufactured by using this conductive paste.

Metal particles included in conductive composition obtained by the invention are highly made to ultra-fine particles and also highly dispersed. Accordingly, the conductive composition obtained by the present invention is a thin-film and able to form an electrode having uniform electronic characteristic.

Multilayer electronic component using the conductive paste obtained by the invention shows superior characteristic such as less defective in short-circuit and high insulation resistance value. These superior characteristics are measurable at multilayer ceramic electronic component of 800 to 900 layers.

BRIEF DESCRIPTION OF THE DRAWINGS

Below are descriptions of the present invention based on preferred embodiments given with reference to the drawings wherein;

FIG. 2 is a step view of manufacturing process for conductive paste used in manufacturing multilayer ceramic capacitor as shown in FIG. 1.

DESCRIPTION OF THE PREFERRED EMBODIMENTS

Multilayer Ceramic Capacitor

Figure 1:
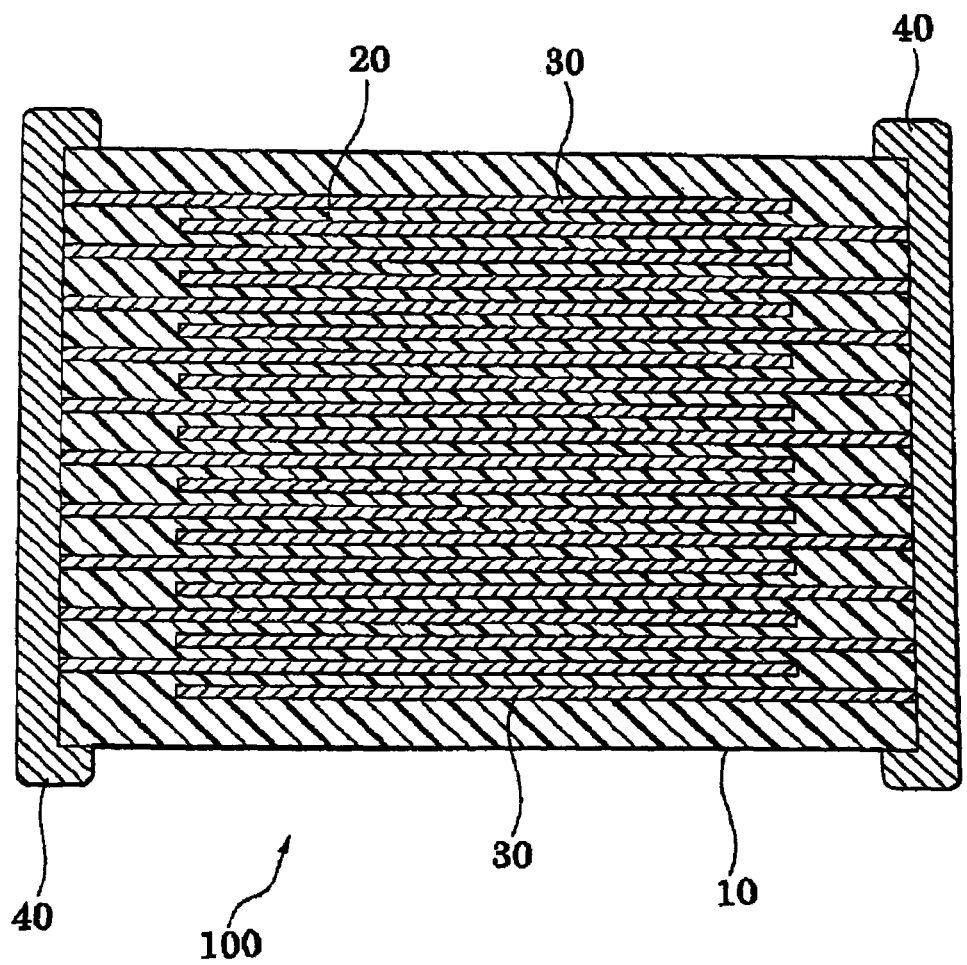
FIG. 1 is a cross-sectional view of multilayer ceramics capacitor as multilayer electronic component manufactured by a method of the present invention.

As shown in FIG. 1, multilayer ceramic capacitor 100 as multilayer electronic component comprises capacitor element body 10 wherein dielectric layer 20 and internal electrode 80 are alternately arranged. At both ends of this capacitor element body 10, a pair of external electrodes 40 which have continuity with each of internal electrode layer 80 alternately arranged in the element body 10 is formed.

Shape of capacitor element body 10 is not particularly limited but normally, rectangular parallelepiped. Further, its size is also not particularly limited and can be suitable size according to its object but normally about (0.4 to 5.6 mm)×(0.2 to 5.0 mm)×(0.2 to 1.9 mm).

Internal electrode 30 is manufactured by conductive paste of the present invention. Conductive material comprising the internal electrode 30 is not particularly limited but Ni, Cu, Ag, Fe or their alloys can be used. Since component material of dielectric layer 20 comprises reduction resistance property, base metals such as Ni or Ni alloys are preferably used as conductive material. As Ni alloys, alloys of one or more element selected from Mn, Cr, Co and Al and Ni are preferable. Dielectric layer 20 is formed with at least one or more element selected from $BaTiO_3$, $CaTiO_3$, $SrTiO_3$ or $BaZrO_3$ as main component The thickness of dielectric layer 20 or external electrodes 40 can suitably be determined.

Manufacturing Method of Multilayer Ceramic Capacitor

Manufacturing method of multilayer ceramic capacitor of the present embodiment is described.

Manufacturing method of multilayer ceramic capacitor of the present embodiment at least comprises mixing process wherein ceramics powder and organic vehicle are mixed, undried sheet manufacturing method wherein manufacturing undried sheet by means of sheet method or printing method, electrode printing method wherein conductive paste as electrode is printed, laminating process, pressure bonding process, cutting process, firing process and forming external electrode process.

Multilayer ceramic capacitor of the present embodiment is manufactured by using conductive paste of the present invention. Manufacturing method of conductive paste used in the present embodiment is described referring to FIG. 2 to FIG. 4.

Manufacturing method of conductive paste at least comprises arranging process (S10 of S14) of wetted metal particles, arranging process (S20 to S28) of ceramics particles, arranging process (S80) of slurry comprising metal particles and ceramics particles and collision dispersion process (S32).

Below is a description of each process.

(1) Arranging Process of Wetted Metal Particles

In the present invention wetted metal particles are arranged. Namely, metal particles are added with a solvent, a surfactant and one or more kinds of the other liquid and thus the metal particles are wetted.

First, metal particles are prepared (S11). Metal particles of the present embodiment can be manufactured by gas-phase chemical reaction method, precipitation reduction method, precipitation deposition method, thermal reduction method or the other known manufacturing processes. However, in the embodiment, manufacturing process of metal particles does not include drying process which is normally used in the abovementioned manufacturing known processes. Namely, undried metal particles after water washed are used.

An average particle size of metal particles is preferably 1.0 μm or less. Normally, when an average particle size is 0.5 μm or less, metal particles are likely to aggregate, however, with manufacturing process of the present embodiment, development of the aggregation can be controlled so that metal particles with an average particle size of 0.5 μm or less, further, 0.4 μm or less or 0.2 μm or less can be used. The metal particles are not particularly limited but the metal particles of Ni, Cu, Ag, Fe or their alloys can be used. Particularly, Ni or Ni alloys are preferable. As Ni alloys, alloys of one or more element selected from Mn, Cr, Co and Al and Ni are preferable, and Ni content of the alloys is preferably 95 wt % or more. Further, in Ni or Ni alloys, a small amount of component of every kind such as P may be included for about 0.1 wt % or less.

Figure 3A:
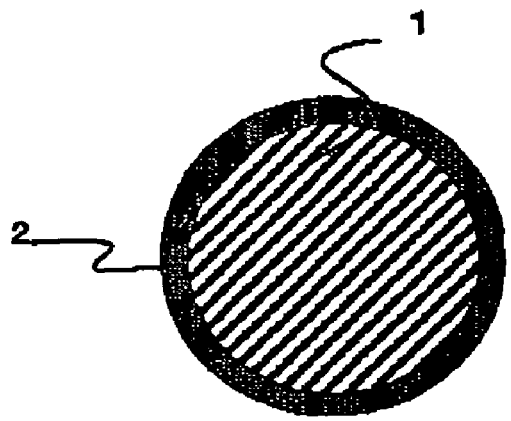
FIG. 3A is a model view of a metal particle condition wetted with liquid during manufacturing process of conductive paste.

Next, metal particles are added with solvent and the other liquids (S12). This addition of solvent and the other liquids remain on the surface of the metal particles and the metal particles are wetted. The liquid wetting the metal on the surface of metal particles is preferably a solvent (the first solvent) being compatible with an organic component included in conductive paste and incompatible with water. For instance, organic vehicle, terpineol or dihydroterpineol may be used. The added amount of liquid wetting the metal is 2 to 100 weight units, preferably 3 to 30 weight units relative to 100 weight units of metal particles. The metal particles condition after this process is modeled in FIG. 3A. As shown in FIG. 3A, metal particle 1 is covered with the liquid 2 such a solvent.

Figure 3B:
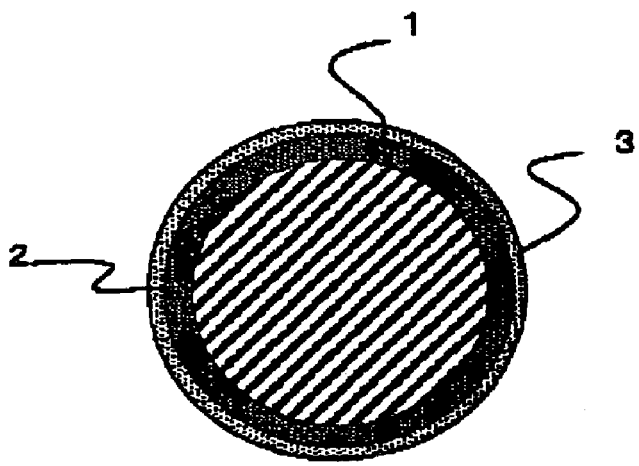
FIG. 3B is a model view of the wetted metal particle condition after surfactant is added.

Then, a surfactant is added (S13). The surfactant is not particularly limited and Cation surfactant, Non-ionic surfactant, Anionic surfactant and the other known surfactant may be used. The amount of surfactant added to the metal particles is preferably 0.05 to 10.0 weight units relative to 100 weight units of metal particles. Adding surfactant will enhance the wettability of metal particles. The metal particle after this process is modeled in FIG. 3B. As shown in FIG. 3B, metal particle 1 is covered with surfactant 8 and liquid 2 such as solvent (the first solvent). It is not shown but metal particle 1 is surrounded by water.

When undried metal particles are added with solvent and the other liquid the metal particles can be precipitated. When the metal particles are precipitated, the metal particles are separated (S14). Further, in the precipitation process of metal particles, addition of surfactant can improve the precipitation speed.

Next, a water compatible solvent (the second solvent) is added to metal particles (S15). As water compatible second solvent, acetone is preferably used. Added amount of the second solvent is preferably 0.3 to 30 weight units relative to 100 weight units of the metal particles.

Figure 3C:
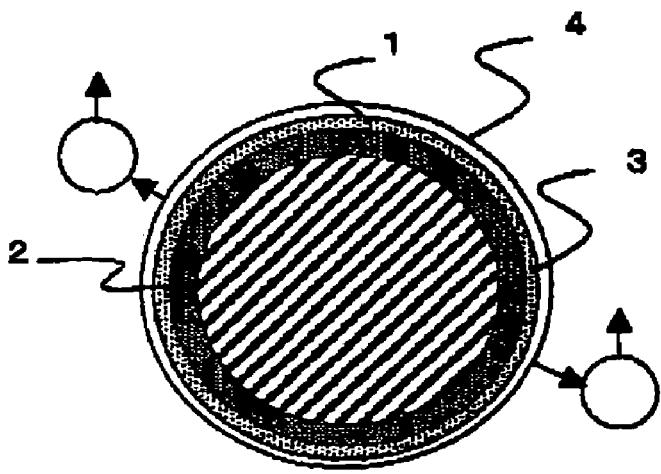
FIG. 3C is a model view of the wetted and surfactant added metal particle condition after the second solvent is added.

The metal particles condition in this process is modeled in FIG. 3C. Liquid such as solvent (the first solvent) and surfactant added metal particle 1 is covered with surfactant 8 and liquid 2 such as solvent, and its surrounding is adhered with remaining water 4. This water 4 has an affinity for the water compatible second solvent and the water 4 volatilize with the second solvent 2. With this process, isolated water from metal particles after water washed and remained water on the surface of the metal particles in the former process can be removed.

After the above processes (S11 to S15), metal particles wetted with solvent and the other liquid can be obtained.

(2) Arrangement of Ceramics Particles

Next, ceramics particles are prepared (S21). Ceramics of the present embodiment is manufactured by a solid state reaction methods an oxalate method, hydrothermal method, sol-gel method, alkoxide method and the other known manufacturing process. Composition of ceramics particles of the present embodiment is not particularly limited. For instance, one or more kind selected from $BaTiO_3$, $CaTiO_3$, $SrTiO_3$ and $BaZrO_3$ can be used.

Preferably, ceramics which has substantially the same composition with ceramics component included in ceramics undried sheet of electric component using this conductive composition (conductive paste). Due to this, defect such as delamination by gap of shrinkage-behavior in firing process between ceramics layer and internal electrode of multilayer component can be prevented. Content of the ceramics particles is 5 to 30 weight units, preferably 6 to 15 weight units relative to 100 weight units of metal paddles.

An average particle size of ceramics particles is preferably, less than an average particle size of metal particles, more preferably a half of or less than an average particle size of the metal particles, most preferably, a quarter of or less than an average particle size of the metal particles.

Solvent is added to the prepared ceramics particles (S22). The solvent added to the ceramics particles may be terpene solvent, glycol solvent, ketone solvent, alcohol solvent, aromatic solvent and principal solvent of the other conductive compositions (conductive paste). After adding the solvent, dispersion equipment is used to mix and disperse (S23).

(3) Arranging Process of Slurry Including Metal Particles and Ceramics Particles Slurry including wetted metal particles and ceramics particles are arranged (S30). Concretely, paste comprising wetted metal particles and solvent added ceramics particles are prepared. By dispersing the obtained paste in solvent, slurry is arranged. The solvent dispersing the paste is not limited and one or more kind can be selected from terpene solvent, glycol solvent, ketone solvent, alcohol solvent, aromatic solvent. The added amount of solvent dispersing the paste is 50 to 150 weight units, preferably 90 to 100 weight units relative to 100 weight units of inorganic substance included.

Composition of the obtained slurry is, relative to 100 weight units of slurry, metal particles are 50 to 75 weight units, organic components are 5 to 45 weight units and ceramics particles are 5 to 20 weight units. More preferable composition of the slurry is, relative to 100 weight units of slurry, metal particles are 60 to 70 weight units, organic components are 15 to 35 weight units and ceramics patties are 5 to 15 weight units. This is due to the following tendencies. When too much metal particles are contained, fluidity of slurry tends to deteriorate, and when too little metal particles are contained, efficiency of dispersion treatment tends to deteriorate. And when too much ceramics particles are contained, a lifetime of nozzle tends to be shorter, and when too little ceramics particles are contained, consumption amount of energy tends to increase. Also, when too much organic components are contained, dispersion treatment time tends to increase and when too little organic component are contained, fluidity of slurry tends to deteriorate.

Further, to control the viscosity of conductive paste, organic vehicle may be included. This organic vehicle is suitably selected from cellulosic resin, acrylic resin, alkyd resin and phenolic resin according to an object. Furthermore, to enhance the efficiency of dispersion, one or more kind can be selected from anion, cation, nonion, polymer and the other surfactant and added.

Addition amount of organic vehicle and surfactant may suitably be determined according to particle size and particle form of metal particles and ceramics particles and concentration of slurry.

Further, concentration of metal particles in slurry and viscosity of slurry are not particularly limited as far as collision dispersion treatment is possible.

(4) Collision Dispersion Process of Slurry

The obtained slurry is supplied into the dispersion equipment and stirred (S31). In the present embodiment, further, collision force is applied to the stirred slurry and disperses metal particles (S32). Further, in this dispersion process, applying shear force to slurry is preferable.

Figure 4A:
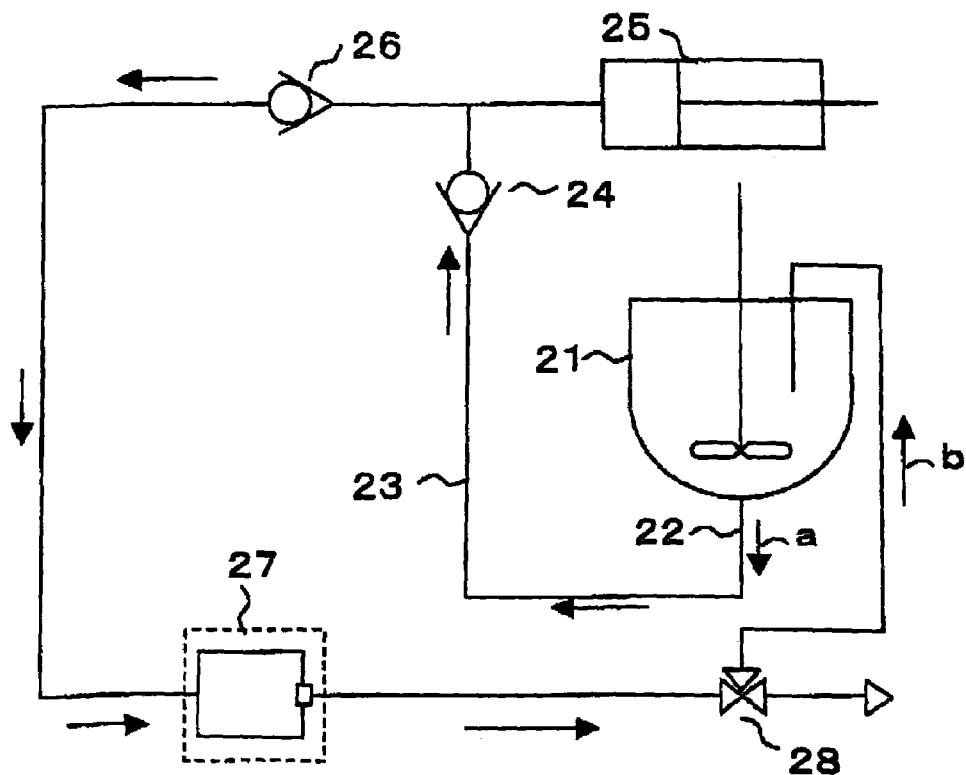
FIG. 4A is a mechanism view of high pressured and wet processed collision dispersion equipment used in collision dispersion process as in FIG. 2.

In collision dispersion process of the present embodiment, high pressured and wet processed collision dispersion equipment shown in FIG. 4 is used Schematic view of system for the high pressured and wet processed collision dispersion equipment used in the present embodiment is shown in FIG. 4A.

High pressured and wet processed collision dispersion equipment shown in FIG. 4A comprises stir tank 21, channel 22, channel 28, check valve or inflow side 24, pressure equipment 25, check valve for outflow side 26, collision dispersion part 27 and switch valve 28.

Slurry is supplied into stir tank 21. The slurry passes along arrow "a" through channel 22 and channel 23 toward collision dispersion part 27. In channel between check valve for inflow side 24 and check valve for outflow side 26, pressure is applied to the slurry. Pressure equipment 25 providing pressure to the slurry is installed in a channel connectable with the other channel in which the slurry passes.

Pressured slurry is lead to collision dispersion part 27.

Figure 4B:
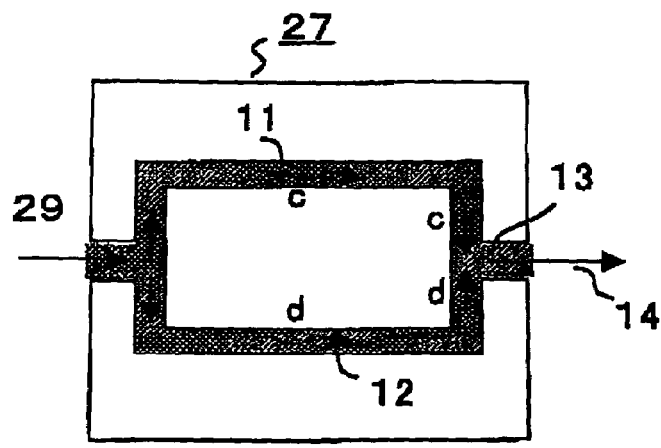
FIG. 4B is a mechanism view of collision dispersion part 27 as shown in FIG. 4A.

System of collision dispersion part 27 is shown in FIG. 4B. As shown in FIG. 4B, collision dispersion part 27 at least comprises input open 29, the first distributary channel 11, the second distributary channel 12, collision part 18 and output 14.

Slurry input from collision dispersion part 27 passes through two channels (the first distributary channel 11 and the second distributary channel 12) diverged from input opening 29. The first slurry passes through the first distributary channel along arrow "c" toward collision part 13. To the contrary, the second slurry passes through the second distributary channel along arrow "d" toward collision part 13. At collision part 13, the first slurry provided along direction "c" and the second slurry provided along direction "d" collide. The direction "d" is contrary different from the direction which the first slurry is provided. Pressure equipment 25 apply pressure to the slurries, then, by joining the slurries mutually, collision force acts on both the first slurry and the second slurry.

Further, the slurry flowing in channel under the pressured condition collides against wall surface of the channel and the slurry is applied with collision force and shear force from various directions and in various strengths. Further, strong shear force acts on the slurry by the process of diverging from one channel to two channels and also by the process of joining from two channels to one channel.

In this way, collision force and/or shear force applied to the slurry acts on metal particles and ceramics particles included in slurry. And the particles are highly made into ultra fine particles and highly dispersed.

The pressure of slurry at collision is preferably $9.8 \times 10^6$ to $2.94 \times 10^8$ Pa (100 to 8000 $kgf/cm^2$), more preferably $1.96 \times 10^7$ to $1.96 \times 10^8$ Pa (200 to 2000 $kg/cm^2$), the most preferably $9.8 \times 10^7$ to $1.96 \times 10^8$ Pa (1000 to 2000 $kg/cm^2$) and particularly preferable is $1.96 \times 10^8$ Pa (2000 $kgf/cm^2$).

Preferably, strength of collision force applied to the slurry is determined by flow speed of the slurry made to collide. Collision speed among the slurries can be optionally set by adjusting pressure which is added to the slurry by pressure equipment 25 and nozzle diameter which jets the slurry. For instance, when the nozzle diameter is 0.1 to 0.45 mm, by suitably adjusting pressurized pressure within the range of 2.94×10⁷ to 2.94×10⁸ Pa (300 to 3000 kgf/cm²), collision speed among the slurries of 100 to 1000 m/sec, can be obtained.

Slurry passed through collision dispersion part 27 is sent to the direction along arrow. Switch nozzle 28 is set down the dispersion part 27. The switch nozzle 28, with its switch, slurry which collision dispersion treated with collision dispersion part 27 is sent as it is or circulate (The circulation route is shown along arrow "b".) by returning the slurry to the stir tank 21. When the slurry is returned to stir tank 21, circulation route "b" is formed and disperse collision treatment can be repeated for optional number of times.

Further, an embodiment of high pressured and wet processed collision dispersion equipment is not limited. This equipment makes high pressured slurries collide directly and particles included in conductive pas into ultra-fine particles, crush and/or disperse. For instance, known equipment disclosed in Japanese Patent Unexamined Publication 9-201521, Japanese Patent Unexamined Publication 9-299774 and Japanese Patent Unexamined Publication 10-57789 can be used.

After collision and mixing, binder and solvent are added and viscosity is arranged (S33) to obtain conductive paste (S34).

EXAMPLE 1

Ni metal particles of 0.4 μm average par size obtained by gas-phase chemical reaction method was water washed. After the water wash, slurry comprising Ni metal particles and water was obtained. In this slurry, 80 weight units of water relative to 100 weight units of Ni metal particles were included.

In this slurry, as solvent, 3 to 80 weight units of terpineol and 0.05 to 10.0 weight units of cation surfactant were mixed and stirred Ni metal particles were precipitated and separated from water. Separated Ni metal particles were added with 0.8 to 80 weight units of acetone as the second solvent. The added acetone was vaporized with water and adhered water to the metal particles was removed. The Ni metal particles were covered and wetted with terpineol and/or surfactant. Obtained Ni metal particles had an average particle size of 0.4 μm.

Paste was obtained by following. Slurry composition comprising 50 wt % of Ni metal particles, 10 wt % of alpha terpineol and 12 wt % of organic vehicle relative to 100 weight of slurry was added with 20 wt % barium titrate paste comprising 50 wt % barium titanate particles having an average particle size of 0.1 μm.

The obtained paste was collision dispersion treated by using the high pressured and wet processed collision dispersion equipment shown in FIG. 4. Collision diversion treating process was on condition of 1.96×10⁸ Pa (2000 kgf/cm²) pressurized pressure, 3 litter/min. treating amount and collision dispersion treatments of 1, 3 and 5 times.

Conductive paste was manufactured by using collision dispersion treated slurry. The manufactured conductive paste comprised 50 wt % of Ni metal particles and 10 wt % of ceramics particles relative to 100 weight of conductive paste and also added organ vehicle and solvent so as to achieve a specific degree of viscosity. This conductive paste was formed into sheets through the doctor-blade method and the sheets were dried. A fragment of these dried sheets was referred to as example 1.

COMPARATIVE EXAMPLE 1

A fragment of sheet for comparative example 1 was manufactured in the same way as example 1 except metal particles were not wetted metal particles but dried metal particles on the market. The metal particles of comparative example 1 were Ni metal particles on the market having an average particle size of 0.4 μm.

COMPARATIVE EXAMPLE 2

A fragment of sheet for comparative example 2 was manufactured in the same way as example 1 except ceramics particles were not included in collision dispersion treated slurry.

EXAMPLE 2

A fragment of sheet for example 2 was manufactured in the same way as example 1 except pressure at collision dispersion was different. Pressure at collision dispersion of example 2 was 9.8×10⁷ Pa (1000 kgf/cm²).

COMPARATIVE EXAMPLE 3

A fragment of sheet for comparative example 3 was manufactured in the same way as example 2 except metal particles were not wetted metal particles but dried metal particles on the market. The metal particles of comparative example 8 were Ni metal particles on the market having an average particle size of 0.4 μm.

COMPARATIVE EXAMPLE 4

A fragment of sheet for comparative example 4 was manufactured in the same way as example 2 except ceramics particles were not included in collision dispersion treated slurry.

EXAMPLE 8

A fragment of sheet for example 3 was manufactured in the same way as example 1 except pressure at collision dispersion was different. Pressure at collision dispersion of example 3 was 1.96×10⁷ Pa (200 kgf/cm²).

COMPARATIVE EXAMPLE 5

A fragment of sheet for comparative example 5 was manufactured in the same way as example 1 except an average particle size of barium titanate particles.

COMPARATIVE EXAMPLE 6

A fragment of sheet for comparative example 6 was manufactured in the same way as example 1 except dispersion method was different. At comparative example 6, dispersion treated by using ball mill dispersion equipment wherein media is alumina in diameter of 5 mm.

COMPARATIVE EXAMPLE 7

A fragment of sheet for comparative example 7 was manufactured in the same way as comparative example 6 except metal particles were not wetted metal particles but dried metal particles on the market.

Examples 1 to 3 and comparative examples 1 to 7 were evaluated with densities of the sheets and surface roughness. The results are shown in table 1.

Dried sheet was cut to a specific size and value was calculated in conformance to the volume and the weight of the cut piece. The density of a dried sheet was evaluated by using a volume obtained. 5.8 g/cm$^8$ or more density of a dried sheet was considered to be good.

The surface roughness; Ra of a dried sheet was measured by using a surface roughness gauge (SURF-MU 570 A Ruby terminal 0.8 mm R, manufactured by Tokyo Seimitsu Co. Ltd.). Ra as mean value of surface roughness among 10 samples and Rmax as value of the maximum unevenness, the difference between concave part and convex part, of surface roughness among 10 samples were evaluated.

example 1, regardless of the number of collision dispersion treatment, showed higher value than the density of dried sheet as in comparative example 1.

Further, comparing the surface roughness of dried sheet as in example 1 and the surface roughness of dried sheet as in comparative example 1 using dried metal particles, Ra and Rmax as in example 1 both showed better value than those of comparative example 1. Accordingly, by example 1, dried sheet with smooth surface was obtained.

Concretely, average values of Ra among the number of collision dispersion treatment of 1 to 3 were compared. An average value of Ra for comparative example 1 was 0.04 and

TABLE 1

| Example No. | Metal Particles | Ceramics Particles | Pressure Condition of Collision Dispersion Treatment (Pa) | Dried Sheet Density (g/m$^3$) Number of Dispersion Treatment | | | Surface Roughness of Dried Sheet (μm) | | | | | |
|---|---|---|---|---|---|---|---|---|---|---|---|---|
| | | | | | | | Ra | | | Rmax | | |
| | | | | 1 | 3 | 5 | 1 | 3 | 5 | 1 | 3 | 5 |
| Ex. 1 | 0.4 μm Average Particle Size of Wetted Metal Particles | 0.1 μm Average Particle Size of Barium Titanate | 1.98 × 10$^8$ | 6.00 | 6.10 | 6.12 | 0.02 | 0.02 | 0.02 | 0.24 | 0.16 | 0.16 |
| Comp. Ex. 1 | 0.4 μm Average Particle Size of Dried Metal Particles | 0.1 μm Average Particle Size of Barium Titanate | 1.98 × 10$^8$ | 5.30 | 5.60 | 5.50 | 0.05 | 0.04 | 0.03 | 0.40 | 0.32 | 0.28 |
| Comp. Ex. 2 | 0.4 μm Average Particle Size of Wetted Metal Particles | None | 1.96 × 10$^8$ | 5.70 | 5.70 | 5.70 | 0.03 | 0.03 | 0.03 | 0.24 | 0.23 | 0.23 |
| Ex. 2 | 0.4 μm Average Particle Size of Wetted Metal Particles | 0.1 μm Average Particle Size of Barium Titanate | 9.8 × 10$^7$ | 6.00 | 6.00 | 6.00 | 0.03 | 0.02 | 0.02 | 0.22 | 0.20 | 0.16 |
| Comp. Ex. 3 | 0.4 μm Average Particle Size of Dried Metal Particles | 0.1 μm Average Particle Size of Barium Titanate | 9.8 × 10$^7$ | 4.80 | 5.00 | 5.10 | 0.18 | 0.10 | 0.10 | 3.20 | 2.40 | 2.20 |
| Comp. Ex. 4 | 0.4 μm Average Particle Size of Wetted Metal Particles | None | 9.8 × 10$^7$ | 5.30 | 5.35 | 5.50 | 0.04 | 0.04 | 0.03 | 0.34 | 0.32 | 0.32 |
| Ex. 3 | 0.4 μm Average Particle Size of Wetted Metal Particles | 0.1 μm Average Particle Size of Barium Titanate | 1.98 × 10$^7$ | 5.80 | 5.00 | 5.00 | 0.03 | 0.02 | 0.02 | 0.28 | 0.28 | 0.18 |
| Comp. Ex. 5 | 0.4 μm Average Particle Size of Wetted Metal Particles | 0.4 μm Average Particle Size of Barium Titanate | 1.98 × 10$^8$ | 5.40 | 5.45 | 5.00 | 0.03 | 0.03 | 0.03 | 0.32 | 0.30 | 0.28 |
| Comp. Ex. 6 | 0.4 μm Average Particle Size of Wetted Metal Particles | 0.1 μm Average Particle Size of Barium Titanate | Ball Mill Mixed | | 5.30 | | | 0.04 | | | 0.34 | |
| Comp. Ex. 7 | 0.4 μm Average Particle Size of Dried Metal Particles | 0.1 μm Average Particle Size of Barium Titanate | Ball Mill Mixed | | 4.80 | | | 0.22 | | | 4.10 | |

EVALUATION OF EXAMPLE 1

(1) As shown in table 1, dried sheet density of example 1, even collision dispersion treatment was done once, showed a good value of 6.00 g/cm$^8$. As the number of collision dispersion treatment increased to 3 and 5, density of dried sheet was 6.10 g/cm$^3$ and 6.12 g/cm$^3$ each and showed tendencies to increase.

Further, surface roughness Ra of dried sheet as in example 1, even collision dispersion treatment was done once, showed a low value of 0.02 μm. Rmax as the maximum unevenness tend to decrease while the number of collision dispersion treatment increased. And after collision dispersion treatment was done for 3 or 5 times, Rmax showed a low value of 0.16 μm. Surface of sheet as in example 1 was extremely smooth.

(2) Comparing the density of dried sheet as in example 1 and the density of dried sheet as in comparative example 1 using dried metal particles, the density of dried sheet as in an average value of Ra for example 1 was 0.02. Accordingly, when the surface roughness for comparative example 1 was 100, surface roughness for example 1 was 50% improved compared to the comparative example 1.

Further, average values of Rmax among the number of collision dispersion treatment of 1 to 3 were compared. An average value of Rmax for comparative example 1 was 0.33 and an average value of Rmax for example 1 was 0.19. Accordingly, when the surface roughness for comparative example 1 was 100, surface roughness for example 1 was 43% improved compared to the comparative example 1.

Due to above, it was realized that comparative example 1 wherein dried metal particles are used than example 1 wherein wetted metal particles are used shows higher density (degree of filling for particles) and more surface smoothness.

(3) Comparing the density of dried sheet as in example 1 and the density of dried sheet as in comparative example 2 without adding ceramics particles, the density of dried sheet as in example 1, regardless of the number of collision dispersion treatment, showed higher value than the density of dried sheet as in comparative example 2.

Further, comparing the surface roughness of dried sheet as in example 1 and the surface roughness of dried sheet as in comparative example 2 using dried metal particles, Ra and Rmax as in example 1 both showed better value than those of comparative example 2. Accordingly, by example 1, dried sheet with smooth surface was obtained.

Concretely, average values of Ra among the number of collision dispersion treatment of 1 to 3 were compared. An average value of Ra for comparative example 2 was 0.03 and an average value of Ra n example 1 was 0.02. Accordingly, when the surface roughness for comparative example 2 was 100, surface roughness for example 1 was 34% improved compared to the comparative example 2.

Further, average values of Rmax among the number of collision dispersion treatment of 1 to 3 were compared. An average value of Rmax for comparative example 2 was 0.23 and an average value of Rmax for example 1 was 0.19. Accordingly, when the surface roughness for comparative example 2 was 100, surface roughness for example 1 was 20% improved compared to the comparative example 2.

Due to above, it was realized that comparative example 2 wherein ceramics particles are not included in slurry than example 1 wherein ceramics particles are included in slurry shows higher density (degree of filling of particles) and more surface smoothness.

(4) Comparing the density of dried sheet as in example 1 and the density of dried sheet as in comparative example 5 wherein the average particle size of barium titanate is different, the density of dried sheet as in example 1, regardless of the number of collision dispersion treatment, showed higher value than the density of dried sheet as in comparative example 5.

Further, comparing the surface roughness of dried sheet as in example 1 and the surface roughness of dried sheet as in comparative example 6 wherein an average particle size of ceramics particles and an average particle size of metal particles are the same, Ra and Rmax as in example 1 both showed better value than those of comparative example 5. Accordingly, by example 1, dried sheet with smooth surface was obtained.

Concretely, average values of Ra among the number of collision dispersion treatment of 1 to 8 were compared. An average value of Ra for comparative example 5 was 0.03 and an average value of Ra for example 1 was 0.02. Accordingly, when the surface roughness for comparative example 5 was 100, surface roughness for example 1 was 84% improved compared to the comparative example 5.

Further, average values of Rmax among the number of collision dispersion treatment of 1 to 3 were compared. An average value of Rmax for comparative example 5 was 0.3 and an average value of Rmax for example 1 was 0.19. Accordingly, when the ice roughness for comparative example 5 was 100, surface roughness for example 1 was 87% improved compared to the comparative example 5.

It was realized that an average particle size of certain particles is preferably smaller than an average particle size of metal particles. Particularly, an average particle size of ceramics particles is preferably a quarter of an average particle size of metal particles.

(5) The density of dried sheet as in example 1 and the density of dried sheet as in comparative example 6 wherein ball mill mixed instead of collision dispersion method were compared. Wetted metal particles were used in comparative example 6. The density of dried sheet as in example 1, regardless of the number of collision dispersion treatment, showed higher value than the density of dried sheet as in comparative example 6.

Further, comparing the surface roughness of dried sheet as in example 1 and the surface roughness of dried sheet as in comparative example 6 obtained by ball m mixing, Ra and Rmax as in example 1 both showed better value than those of comparative example 6. Accordingly, by example 1, dried sheet with smooth surface was obtained.

Concretely, by comparing Ra, Ra for comparative example 6 was 0.04 and an average value of Ra for example 1 was 0.02. Accordingly, when the surface roughness for comparative example 6 was 100, surface roughness for example 1 was 50% improved compared to the comparative example 6.

Further, by comparing Rmax. Rmax for comparative example 6 was 0.34 and an average value of Rmax for example 1 was 0.19. Accordingly, when the surface roughness or comparative example 6 was 100, surface roughness for example 1 was 44% improved compared to the comparative example 6.

Due to above, it was realized that, even when wetted metal particles are used, comparative example 6 wherein ball mill mixed than example 1 wherein collide dispersed show higher density (degree of filling or particles) and more surface smoothness.

Comparative example 7 provided an dried sheet wherein dried metal particles are used and ball mill mixed, The density of dried sheet as in example 1, regardless of the number of collision dispersion treatment, showed higher value than the density of dried sheet as in comparative example 7. Further, comparing the surface roughness of dried sheet as in example 1 and the surface roughness of dried sheet as in comparative example 7 obtained by using wetted metal particles and ball mill mixing, Ra and Rmax as in example 1 both showed better value than those of comparative example 7. Accordingly, by example 1, dried sheet with smooth surface was obtained.

Considering above, as dried sheet as in example 1 showed high density (degree of filing for particles) and high surface smoothness property, it was realized that metal particles included in the sheet as in example 1 are sufficiently crushed, made to ultra-fine particles and uniformly dispersed.

EVALUATION OF EXAMPLE 2

(1) As on in table 1, dried sheet density of example 2, even collision dispersion treatment was done once, showed a good value of 6.00 g/cm$^8$. Further, surface roughness Ra of dried sheet as in example 2, after two collision dispersions, showed a low value of 0.02 μm. And after collision dispersion treatment was done for 5 times, Rmax showed a low value of 0.18 μm. Example 2, it was collision dispersion treated with a half pressure of example 1, however, both density of dried sheet and surface roughness showed good results. Namely, dispersion treatment method of the present embodiment shows high dispersion efficiency. Accordingly, with low energy, the present embodiment shows high efficiency in making ultra-fine particles and in dispersion leading to lower the cost.

(2) Comparing the density of dried sheet as in example 2 and the density of dried sheet as in comparative example 3 using dried metal particles, the density of dried sheet as in example 2, regardless of the number of collision dispersion treatment, showed higher value than the density of dried sheet as in comparative example 3.

Further comparing the surface roughness of dried sheet as in example 2 and the surface roughness of dried sheet as in comparative example 3 using dried metal particles, Ra and Rmax as in example 2 both showed better value than those of comparative example 3. Accordingly, by example 2, dried sheet with smooth surface was obtained.

Concretely, average values of Ra among the number of collision dispersion treatment of 1 to 3 were compared. An average value of Ra for comparative example 3 was 0.12 and an average value of Ra for example 2 was 0.023. Accordingly, when the surface roughness for comparative example 3 was 100, surface roughness for example 2 was 81% improved compared to the comparative example 3.

Further, average values of Rmax among the number of collision dispersion treatment of 1 to 3 were compared. An average value of Rmax for comparative example 3 was 2.6 and an average value of Rmax for example 2 was 0.20. Accordingly, when the surface roughness for comparative example 3 was 100, surface roughness for example 2 was 92% improved compared to the comparative example 3.

Due to above, it was realized that comparative example 8 wherein dried metal particles are used than example 2 wherein wetted metal particles are used shows higher density (degree of filling for particles) and more surface smoothness.

(3) Comparing the density of dried sheet as in example 2 and the density of dried sheet as in comparative example 4 without adding ceramics particles, the density of dried sheet as in example 2, regardless of the number of collision dispersion treatment, showed higher value than the density of dried sheet as in comparative example 4.

Further, comparing the surface roughness of dried sheet as in example 2 and the surface roughness of dried sheet as in comparative example 4 using dried metal particles, Ra and Rmax as in example 2 both showed better value than those of comparative example 4. Accordingly, by example 2, dried sheet with smooth surface was obtained.

Concretely, average values of Ra among the number of collision dispersion treatment of 1 to 3 were compared. An average value of Ra for comparative example 4 was 0.087 and an average value of Ra for example 2 was 0.023. Accordingly, when the surface roughness for comparative example 4 was 100, surface roughness for example 2 was 38% improved compared to the comparative example 4.

Further, average values of Rmax among the number of collision dispersion treatment of 1 to 3 were compared. An average value of Rmax for comparative example 4 was 0.88 and an average value of Rmax for example 2 was 0.20. Accordingly, when the surface roughness for comparative example 4 was 100, surface roughness for example 2 was 40% improved compared to the comparative example 4.

Due to above, it was realized that comparative example 4 wherein ceramic particles are not included in slurry than example 2 wherein ceramics particles are included in slurry shows higher density (degree of filling for particles) and more surfaces smoothness.

(4) Comparing the density of dried sheet as in example 2 and the density of dried sheet as in comparative example 5 wherein the average particle size of barium titanate is different, the density of dried sheet as in example 2, regardless of the number of collision dispersion treatment, showed higher value than the density of dried sheet as in comparative example 5.

Further, comparing the surface roughness of dried sheet as in example 2 and the surface roughness of dried sheet as in comparative example 5 wherein an average particle size of ceramics particles and an average particle size of metal particles are the same, Ra and Rmax as in example 2 both showed better value than those of comparative example 5. Accordingly, by example 2, dried sheet with smooth surface was obtained.

Concretely, average values of Ra among the number of collision dispersion treatment of 1 to 3 were compared. An average value of Ra for comparative example 5 was 0.03 and an average value of Ra for example 2 was 0.028. Accordingly, when the surface roughness for comparative example 5 was 100, surface roughness for example 2 was 24% improved compared to the comparative example 5.

Further, average values of Rmax among the number of collision dispersion treatment of 1 to 3 were compared. An average value of Rmax for comparative example 5 was 0.8 and an average value of Rmax for rumple 2 was 0.20. Accordingly, when the surface roughness for comparative example 5 was 100, surface roughness for example 2 was 34% improved compared to the comparative example 5.

Due to above, it was realized that an average particle size of ceramics particles is preferably smaller than an average particle size of metal particles. Particularly, an average particle of ceramics particles is preferably a quarter of an average particle size of metal particles.

(5) The density of dried sheet as in example 2 and the density of dried sheet as in comparative example 6 wherein ball mill mixed instead of collision dispersion method were compared. Wetted metal particles were used in comparative example 6. The density of dried sheet as in example 2, regardless of the number of collision dispersion treatment, showed higher value than the density of dried sheet as in comparative example 6.

Further, comparing the surface roughness of dried sheet as in example 2 and the surface roughness of dried sheet as in comparative example 6 obtained by ball mill mixing, Ra and Rmax as in example 2 both showed better value than those of comparative example 6. Accordingly, by example 2, dried sheet with smooth surface was obtained.

Concretely, by comparing Ra, Ra for comparative example 6 was 0.04 and an average value of Ra for example 2 was 0.023. Accordingly, when the surface roughness for comparative example 6 was 100, surface roughness for example 2 was 43% improved compared to the comparative example 6.

Further, by comparing Rmax, Rmax for comparative example 6 was 0.34 and an average value of Rmax for example 2 was 0.2. Accordingly, when the surface roughness for comparative example 6 was 100, surface roughness for example 2 was 41% improved compared to the comparative example 6.

Due to above, it was re d that, even when wetted metal particles are used, comparative example 6 wherein ball mill mixed than example 2 wherein collide dispersed shows higher density (degree of filling for particles) and more surface smoothness.

Comparative example 7 provided an dried sheet wherein dried metal particles are used and ball mill mixed. The density of dried sheet as in example 2, regardless of the number of collision dispersion treatment, showed higher value than the density of dried sheet as in comparative example 7. Further, comparing the surface roughness of dried sheet as in example 2 and the surface roughness of dried sheet as in comparative example 7 obtain by using wetted metal particles and ball mill mix, Ra and Rmax as in example 2 both showed better value than those of comparative example 7. Accordingly, by example 2, dried sheet with smooth surface was obtained.

Considering above, as dried sheet as in example 2 showed high density (degree of filling for particles) and high surface smoothness property, it was realized that metal particles included in the sheet as in example 2 are sufficiently crushed, made to ultra-fine particles and uniformly dispersed.

Dried sheet obtained in example 2 was collision dispersion treated with a half pressure of example 1, however, both density of dried sheet and surface roughness showed good results. Due to this, it was realized that, with low energy, metal particles could efficiently be crushed and made into ultra-fine particles and also uniformly dispersed. Further, by the results of example 1 and example 2, it was also realized that, with the press within the range of $9.8 \times 10^7$ to $1.96 \times 10^8$ Pa, conductive composition (conductive paste) showing high density (degree of finishing for particles) and 1 surface smoothness property can be obtained.

EVALUATION OF EXAMPLE 3

Dried sheet obtained in example 3 was collision dispersion treated with 1/10 pressure of example 1 and 1/5 pressure of example 2, however, both density of dried sheet and surface roughness showed good results. As shown in table 1, example 3 showed high value of 5.80 to 6.00 g/cm³ dried sheet density, low value of 0.02 to 0.03 μm dried sheet surface roughness Ra and low value of 0.22 μm average value for Rmax as value of the maximum unevenness. As above, dried sheet surface of example 3 was extremely smooth.

Due to above, it was realized that, with low energy, metal particles could sufficiently be crushed and made into ultra-fine particles and also uniformly dispersed. By the results of example 1 to example 3, it was also realized that with the pressure within the range of $1.96 \times 10^7$ to $1.96 \times 10^8$ Pa, conductive composition (conductive paste) showing high density (degree of filling for particles) and high surface smoothness property can be obtained.

According to the present invention, metal particles comprised in conductive paste can sufficiently be crushed and made into ultra-fine particles and also uniformly dispersed. Conductive composition and conductive paste without developing aggregation of Metal particles can be provided.

According to the conductive paste obtained by manufacturing method of the present invention, extremely good particle filling property of fine electrode film wherein the film thickness is without discontinuous of electrode and with superior degree of smoothness can be formed. Due to this, conductive composition and conductive paste that may remarkably improve reliability and yield of electronic component can be provided.

According to the present invention, conductive composition and conductive paste that may form extremely good particle filling property of fine electrode film can be manufactured with low energy and low cost.

In accordance with the conductive paste obtained by manufacturing method of the invention, multilayer electrode component having low rat generation of inferior insulation, high pulse breakdown voltage and high insulation resistance can be provided. Accordingly, multilayer electronic component, particularly thin-film multilayer electronic component and multilayer electronic component having many layers can enhance their reliability.

The invention claimed is:

1. A manufacturing process of conductive composition including metal particles and ceramics particles, comprising the steps of:
   providing undried metal particles having been water washed;
   wetting undried said metal particles by a liquid solvent that is compatible with an organic component included in said conductive composition and is incompatible with water; and
   colliding a first slurry including at least said wetted metal particles and said ceramics particles with a second slurry supplied along a different direction from the first slurry, wherein
   an average particle size of said metal particles is 0.5 μm or less, and
   an average particle size of said ceramics particles is a quarter of or less than the average particle size of said metal particles.

2. The manufacturing process of conductive composition as in claim 1, wherein said first slurry and said second slurry have substantially the same composition.

3. The manufacturing process of conductive composition as in claim 1, wherein said conductive composition is a conductive paste to form an electrode on ceramic dielectric substrate.

4. A manufacturing process of conductive composition including metal particles and ceramics particles, comprising the steps of:
   providing undried metal particles having been water washed;
   wetting undried said metal particles by a liquid solvent that is compatible with an organic component included in said conductive composition and is incompatible with water; and
   colliding a first slurry including at least said wetted metal particles and said ceramics particles with a second slurry supplied along a different direction from the first slurry, wherein
   an average particle size of said ceramics particles is less than that of said metal particles, and
   an average particle size of said metal particles is 0.5 μm or less.

5. A manufacturing process of conductive composition including metal particles and ceramics particles, comprising the steps of:
   providing undried metal particles having been water washed;
   wetting undried said metal particles by a liquid solvent that is compatible with an organic component included in said conductive composition and is incompatible with water; and
   colliding a first slurry including at least said wetted metal particles and said ceramics particles with a second slurry supplied along a different direction from the first slurry, wherein
   said metal particles are Ni or Ni content compound,
   an average particle size of said metal particles is 0.5 μm or less, and
   an average particle size of said ceramics particles is a quarter of or less than the average particle size of said metal particles.

6. The manufacturing process of conductive composition as in claim 5, wherein said first slurry and said second slurry have substantially the same composition.

7. The manufacturing process of conductive composition as in claim 5, wherein said conductive composition is a conductive paste to form an electrode on ceramic dielectric substrate.

8. A manufacturing process of conductive composition including metal particles and ceramics particles, comprising the steps of:
   providing undried metal particles having been water washed;

wetting undried said metal particles by a liquid solvent that is compatible with an organic component included in said conductive composition and is incompatible with water; and colliding a first slurry including at least said wetted metal particles and said ceramics particles with a second slurry supplied along a different direction from the first slurry, wherein an average particle size of said metal particles is 0.5 µm or less, and an average particle size of said ceramics particles is a half of or less than the average particle size of said metal particles.

9. A manufacturing process of conductive composition including metal particles and ceramics particles, comprising the steps of:

providing undried metal particles having been water washed;

wetting undried said metal particles by a liquid solvent that is compatible with an organic component included in said conductive composition and is incompatible with water; and colliding a first slurry including at least said wetted metal particles and said ceramics particles with a second slurry supplied along a different direction from the first slurry, wherein said metal particles are Ni or Ni content compound, an average particle size of said metal particles is 0.5 µm or less, and an average particle size of said ceramics particles is a half of or less than the average particle size of said metal particles.

* * * * *